United States Patent
Polzounov et al.

(10) Patent No.: US 12,380,710 B2
(45) Date of Patent: Aug. 5, 2025

(54) SYSTEM AND METHOD FOR DEEP LEARNING BASED LANE CURVATURE DETECTION FROM 2D IMAGES

(71) Applicant: Rivian IP Holdings, LLC, Plymouth, MI (US)

(72) Inventors: Andrei Polzounov, Seattle, WA (US); Vikram Vijayanbabu Appia, San Jose, CA (US); Ravi Kumar Satzoda, Milpitas, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 182 days.

(21) Appl. No.: 18/115,427

(22) Filed: Feb. 28, 2023

(65) Prior Publication Data
US 2024/0221389 A1 Jul. 4, 2024

Related U.S. Application Data

(60) Provisional application No. 63/436,215, filed on Dec. 30, 2022.

(51) Int. Cl.
*G06K 9/00* (2022.01)
*B60W 50/14* (2020.01)
(Continued)

(52) U.S. Cl.
CPC ........... *G06V 20/588* (2022.01); *B60W 50/14* (2013.01); *G06T 7/13* (2017.01); *G06T 7/64* (2017.01);
(Continued)

(58) Field of Classification Search
CPC ... G06V 20/588; G06V 10/761; B60W 50/14; G06T 7/13; G06T 7/64; G06T 2207/30256
See application file for complete search history.

(56) References Cited

U.S. PATENT DOCUMENTS

| | | | |
|---|---|---|---|
| 6,850,629 B2 * | 2/2005 | Jeon | G06T 7/64 382/104 |
| 8,391,556 B2 * | 3/2013 | Kuehnle | G06T 7/60 382/104 |

(Continued)

FOREIGN PATENT DOCUMENTS

| | | | | |
|---|---|---|---|---|
| CN | 107730520 A | * | 2/2018 | ......... G06K 9/00798 |
| CN | 110487562 B | * | 4/2020 | ............. G01S 19/52 |

OTHER PUBLICATIONS

Lane Departure Warning, Keeping Drivers in their Lane, Roadways departure is a Major cause of traffic fatalities, An Intel Company, retrieved form: <https://ims.mobileye.com/fleets/us/technology/lane-departure-warning/> 2023, 4 pages.
(Continued)

*Primary Examiner* — Shervin K Nakhjavan
(74) *Attorney, Agent, or Firm* — Haley Guiliano LLP

(57) ABSTRACT

Methods and systems are provided to detect an instance of a line in a two-dimensional image captured by a vehicle and to determine whether the instance of the line is a lane boundary for a lane that will be used by the vehicle to traverse a route. An instance of a line in a two-dimensional image captured by a vehicle is detected using processing circuitry. The processing circuitry is used to determine that the instance of the line is a lane boundary for a lane associated with the vehicle. A curve fit for the lane boundary based on the instance of the line is determined using the processing circuitry. The processing circuitry is also used to determine a sinuosity of the lane based on the curve fit. Execution of a vehicle action is facilitated using the processing circuitry based on the determined sinuosity.

18 Claims, 8 Drawing Sheets

(51) Int. Cl.
*G06T 7/13* (2017.01)
*G06T 7/64* (2017.01)
*G06V 10/74* (2022.01)
*G06V 20/56* (2022.01)

(52) U.S. Cl.
CPC .. *G06V 10/761* (2022.01); *G06T 2207/30256* (2013.01)

(56) References Cited

U.S. PATENT DOCUMENTS

| | | | |
|---|---|---|---|
| 10,613,532 B2* | 4/2020 | Shashua | G01C 21/32 |
| 10,671,859 B2* | 6/2020 | Fujikawa | G08G 1/167 |
| 10,997,433 B2* | 5/2021 | Xu | G06F 18/24143 |
| 11,113,544 B2* | 9/2021 | Lee | G08G 1/167 |
| 11,544,940 B2* | 1/2023 | Baik | G06N 3/02 |
| 11,710,294 B2* | 7/2023 | Kumano | G06V 20/588 |
| | | | 382/103 |
| 2002/0081000 A1* | 6/2002 | Ham | G06V 20/588 |
| | | | 382/104 |
| 2010/0250064 A1* | 9/2010 | Ota | B60W 40/076 |
| | | | 348/148 |
| 2017/0177951 A1* | 6/2017 | Yang | G06T 7/11 |
| 2019/0251372 A1* | 8/2019 | Dwivedi | G06V 20/588 |
| 2023/0048230 A1* | 2/2023 | Lee | B60W 50/14 |

OTHER PUBLICATIONS

Naven, D., et al., "Towards End-to-End Lane Detection: an Instance Segmentation," IEEE Intelligent Vehicles Symposium (IV), (Jun. 26-30, 2018), pp. 286-291.

* cited by examiner

SYSTEM AND METHOD FOR DEEP LEARNING BASED LANE CURVATURE DETECTION FROM 2D IMAGES

CROSS-REFERENCE TO RELATED APPLICATIONS

This application claims the benefit of U.S. Provisional Patent Application No. 63/436,215 filed Dec. 30, 2022, the disclosure of which is hereby incorporated by reference herein in its entirety.

INTRODUCTION

The present disclosure is directed to detecting oncoming lane curvature and/or elevation changes in the path of travel of a vehicle.

SUMMARY

Vehicles traveling on the road are often following lanes that may have curvature and elevation changes. Accordingly, it is not always clear whether another vehicle or obstruction detected by a vehicle's camera is actually in the path of travel of the vehicle or not. It is therefore useful to determine whether the lane in which the vehicle is travelling has oncoming curvature or elevation changes.

In accordance with the present disclosure, oncoming lane curvature and elevation changes in the travel path of a vehicle are detected using 2D images. Detecting the oncoming curvature and elevation in 2D images helps avoid processor intensive tasks of wrapping the image into a 3D space or bird's eye view coordinates. In addition, projecting the lanes into a 3D space exasperates sensitivity to camera calibration errors and assumes a flat lane with no elevations, thereby resulting in errors when there are significant elevations in the lane of travel of the vehicle.

In accordance with some embodiments of the present disclosure, system and methods are provided for detecting curvature and elevation changes in the lane of travel of the vehicle using a 2D image captured by a camera of the vehicle. This avoids, for example, the need for projecting lanes into a 3D space and also increases detection speed as well as reduces error in detection of the lanes. Detection of each instance of one or more of a lane line, path indicator, or other directional travel indicator may be achieved using deep learning instance segmentation. Based on the detection of each instance of the line (e.g., path indicator), a determination may be made regarding the boundaries of the ego lane in which the vehicle is travelling. The ego lane corresponds to a lane in which the vehicle is expected to travel during the execution of a route and is defined based on clearances needed in order for the vehicle to traverse the lane uninhibited.

In some embodiments, the processing circuitry of the vehicle measures the distance in the image from the center of the image to the centroid of the two-dimensional lines (e.g., path indicators) to determine which line (or path indicator) belongs to the ego lane as the left ego line and the right ego line (e.g., such that the left and right ego lines correspond to a pair of path indicators forming a lane between the, which can be traversed by the vehicle without being impeded).

In some embodiments, based on the detected instance of the path indicator, the processing circuitry determines a curve fit for the ego lane boundary. This may be achieved by fitting a third order polynomial to the instance of the path indicator.

In some embodiments, the processing circuitry determines the sinuosity of the ego lane based on the curve fit. The sinuosity may be determined by dividing a length of curve fit by a distance of a shortest path between a starting point and an ending point of the curve fit. Whether the ego lane comprises curvature can be determined by comparing the sinuosity to a threshold. For example, a threshold of 1.05 may be used to indicate the presence of upcoming curvature in the ego lane.

In some embodiments, the processing circuitry determines two curve fits, a first for the left ego lane boundary and a second for the right ego lane boundary. The sinuosity of the ego lane can be determined based the first and second curve fits. In addition, upcoming elevation changes in the ego can also be determined based on the first and second curve fits. For example, an upcoming increase in elevation is determined based on the curve fit of the left ego lane boundary having curvature to the left and the curve fit of the right ego lane boundary having curvature to the right.

In some embodiments, the processing circuitry causes a vehicle action to be performed based on the sinuosity. For example, an ego lane may be displayed on a display of the vehicle based on the sinuosity. As another example, an advanced driver assistance system (ADAS) may perform one or more actions based on the sinuosity, such as determining whether an object is in the path of the vehicle and displaying a warning or initiating braking of the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

In some embodiments, the present disclosure is directed to capturing 2D images and using them to detect curvature and/or elevation changes in the path of travel of the vehicle. The systems and methods of the present disclosure may also perform an action based on the curvature and/or elevation changes such as providing an alert to the user on a user interface about an object in their path of travel based the presence of the curvature and/or elevation. The present disclosure provides examples of how the capturing and processing of 2D imagery eliminates the need to pair the systems and method disclosed herein with additional or alternative sensors. For example, the disclosed systems and methods can accurately determine that an object appearing to be in front of the vehicle in a 2D frame may be a vehicle following a curved lane travelling parallel to a curved lane being traversed by the vehicle. Therefore, a more accurate characterization of object trajectories and a more accurate depiction of a lane may be generated by the systems and methods of this disclosure without requiring a plurality of additional sensors and processing of data which may yield false alerts (e.g., proximity alerts).

Figure 1:
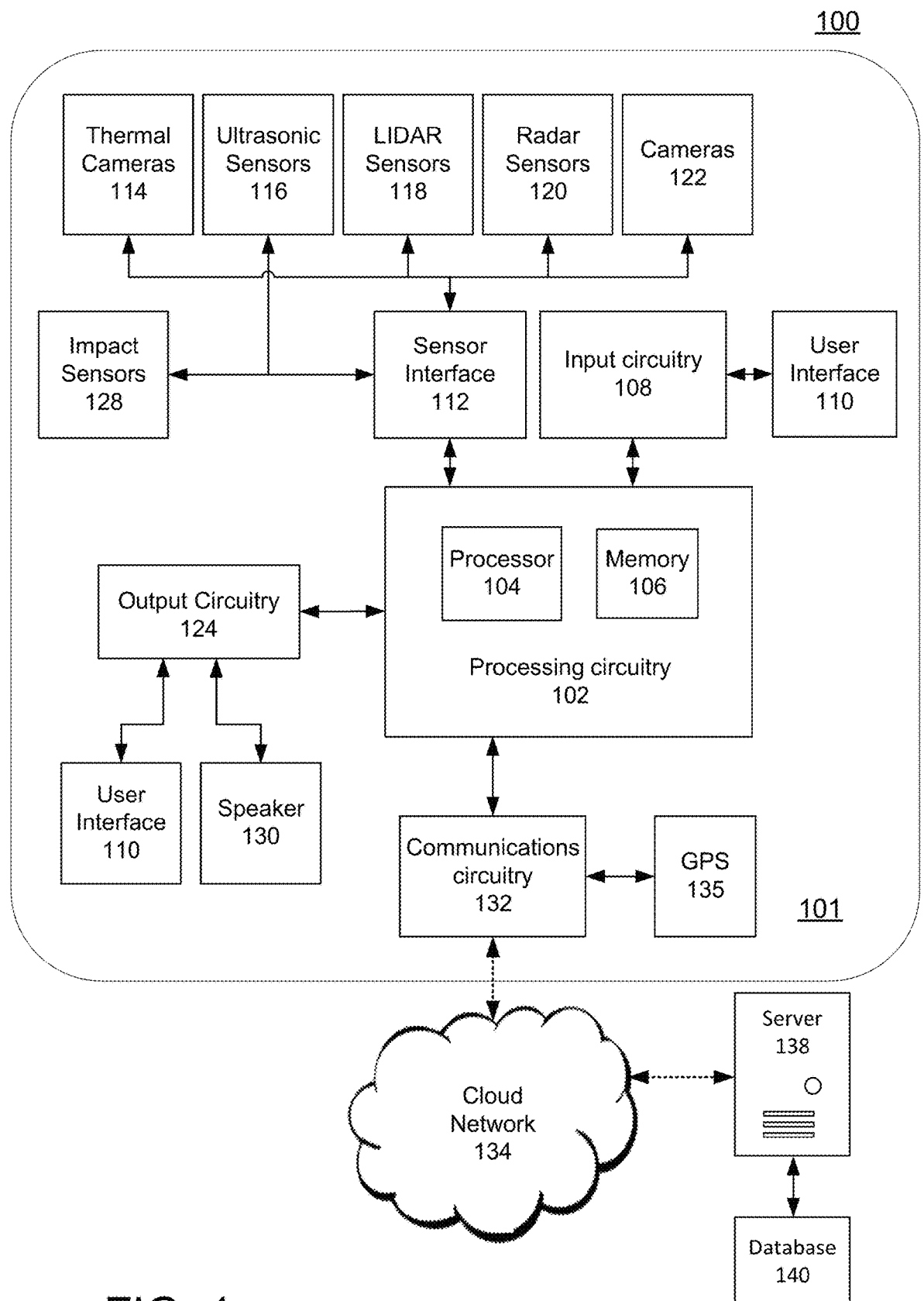
FIG. 1 shows a block diagram of components of a system with processing circuitry for a vehicle to capture a 2D image and determine the presence of curvature or elevation in the path of travel of the vehicle, in accordance with some embodiments of the present disclosure.

FIG. 1 shows a block diagram of components of a system 100 with processing circuitry 102 for a vehicle 101 to capture a 2D image and determine the presence of curvature or elevation in the path of travel of the vehicle, in accordance with some embodiments of the present disclosure. In some implementations, the vehicle 101 may be a car (e.g., a coupe, a sedan, a truck, an SUV, a bus), a motorcycle, an aircraft (e.g., a drone), a watercraft (e.g., a boat), or any other type of vehicle. The vehicle comprises processing circuitry 102, which may comprise a processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements (e.g., non-transitory computer-readable medium) having non-transitory storage of commands or instructions encoded thereon, that, when executed by processor 104, cause processor 104 to operate vehicle 101 in accordance with embodiments described above and below. The memory 106 may further store sensor data received via the sensor interface 112 as well as data received from the user interface 110 via the input circuitry 108 and database 140 via the communications circuitry 132. In some embodiments, database 140 is hosted by a server 138 and is communicatively reachable by the communications circuitry 132 by a network 134. Processing circuitry 102 may be communicatively connected to components of vehicle 101 via one or more wires, or via wireless connection. In some embodiments, network 134 is a cloud-based network that is communicatively coupled to communications circuitry 132 and server 138, each coupling formed by a wired or wireless connection.

Processing circuitry 102 may be communicatively connected to a sensor interface 112, which may be configured to provide a network bus for a set of sensors used on the vehicle. The set of sensors may include thermal cameras 114, ultrasonic sensors 116, LIDAR sensors 118, radar sensors 120, cameras 122, and impact sensor 128. In some embodiments, to retrieve the sensor data from the set of sensors, the processing circuitry 102 may continuously poll via the sensor interface 112. In alternate embodiments, the set of sensors, including but not limited to the impact sensor 128, may detect an impact event and send an interrupt signal to the processing circuitry 102 to initiate further sensor data retrieval for identification and classification of the impact. In some embodiments, one or more of these sensors are used for an advanced driver assistance system (ADAS). For example, radar sensors 120 and cameras 122 may be used for determining when to alert drivers of ADAS feature warnings or performing automatic events to protect the vehicle user while driving. However, the systems and methods of the present disclosure may use some of the same ADAS sensors but for providing user and vehicle 101 protection while the vehicle is parked, whether the user is located inside or located in the surrounding vicinity of vehicle 101. In some embodiments, sensors other than the ADAS sensors may be used for providing user and vehicle 101 protection.

One of cameras 122, may capture 2D images of the path ahead of the vehicle, depicting vehicles or obstructions, as well as the lanes in front of the vehicle. The processing circuitry 102 may be communicatively connected to cameras 122 via the sensor interface 112. The processing circuitry may process the 2D images to determine the instances of the path indicators detected in the 2D image. The instances of the path indicators may be determined based on deep learning instance segmentation as described below. The processing circuitry 102 may process the data extracted from the 2D images (e.g., the instances of lines or path indicators) to determine the boundaries of the ego lane, which is the lane in which the vehicle is travelling. This determination may be achieved by measuring a distance in the image from the center of the image to the centroid of the determined instances of two-dimensional lines. Based on the measurements, the processing circuitry 102 determines which line instance is the left ego line and which line instance is the right ego line (to the extent two lines are identified), the left ego line and the right ego line forming the boundaries of the ego lane in which the vehicle 101 is travelling.

The processing circuitry 102 may further process the 2D image from the camera 122 to determine a curve fit for the ego lane boundary. The processing circuitry 102 may fit a third order polynomial to the instance of the boundaries of the ego lane in order to obtain a curve fit for the left ego line and the right ego line, as detected based on the measurements. In some embodiments, a Bezier curve may be used to obtain the curve fit for the line instance. In some embodiments, other types of curve fits may be used as well.

The processing circuitry 102 may further process the determined curve fit to calculate a sinuosity of the ego lane. The sinuosity may be determined by dividing a length of the curve fit by a distance of a shortest path between a starting point and an ending point of the curve fit. A determination of the curvature and/or elevation changes in the lane may be made based on the sinuosity of the ego lane, as calculated by the processing circuitry 102 of the vehicle 101.

Once a determination of the curvature and/or elevation change has been made by the processing circuitry 102, it may be determined if any objects detected in the 2D image are in the path of travel of the vehicle 101, based on the detected curvature and/or elevation change. The processing circuitry 102, may make this determination by calculating the coordinates of the detected objects or other vehicles in front of the vehicle 101 in the 2D image and determining if those coordinates fall in the ego lane based on the curvature or elevation change of the ego lane. If it is determined by the processing circuitry 102 that the object or the other vehicles are in the path of travel of the vehicle 101, the processing circuitry may use the user interface 110 within the vehicle to notify the user of an object in the path of travel.

A user interface 110 (e.g., a steering wheel, a touch screen display, buttons, knobs, a microphone, or other audio capture devices, etc.) may be communicatively coupled to the processing circuitry 102 via input circuitry 108. In some embodiments, a user (e.g., driver or passenger) of vehicle 101 may be permitted to select certain settings in connection with the operation of vehicle 101 (e.g., select a predetermined area for the vehicle to protect). In some embodiments, processing circuitry 102 may be communicatively connected to a navigation system, e.g., Global Positioning System (GPS) system 135 via a communications circuitry 132 of vehicle 101, where the user may interact with the GPS system 135 via user interface 110. GPS system 135 may be in communication with multiple satellites to ascertain the vehicle's location and provide the current vehicle location to the processing circuitry 102. As another example, the positioning device may operate on terrestrial signals, such as cell phone signals, Wi-Fi signals, or ultra-wideband signals to determine a location of vehicle 101. The current vehicle location may be in any suitable form such as a geographic coordinate.

In some embodiments, processing circuitry 102 may be in communication (e.g., via communications circuitry 132) with a database 140 wirelessly through a server 138 and network 134. In some embodiments, some, or all of the information in database 140 may also be stored locally in memory 106 of vehicle 101.

The processing circuitry 102 may also be communicatively connected to output circuitry 124, may be communicatively connected to the user interface 110 and speakers 130 in order to present information to the user (e.g., display or play a notification to the user of an approaching lane curvature, elevation changes, or information about an object in the path of travel.

It should be appreciated that FIG. 1 only shows some of the components of vehicle 101, and it will be understood that vehicle 101 also includes other elements commonly found in vehicles, e.g., a motor, brakes, wheels, wheel controls, turn signals, windows, doors, etc.

Figure 2:
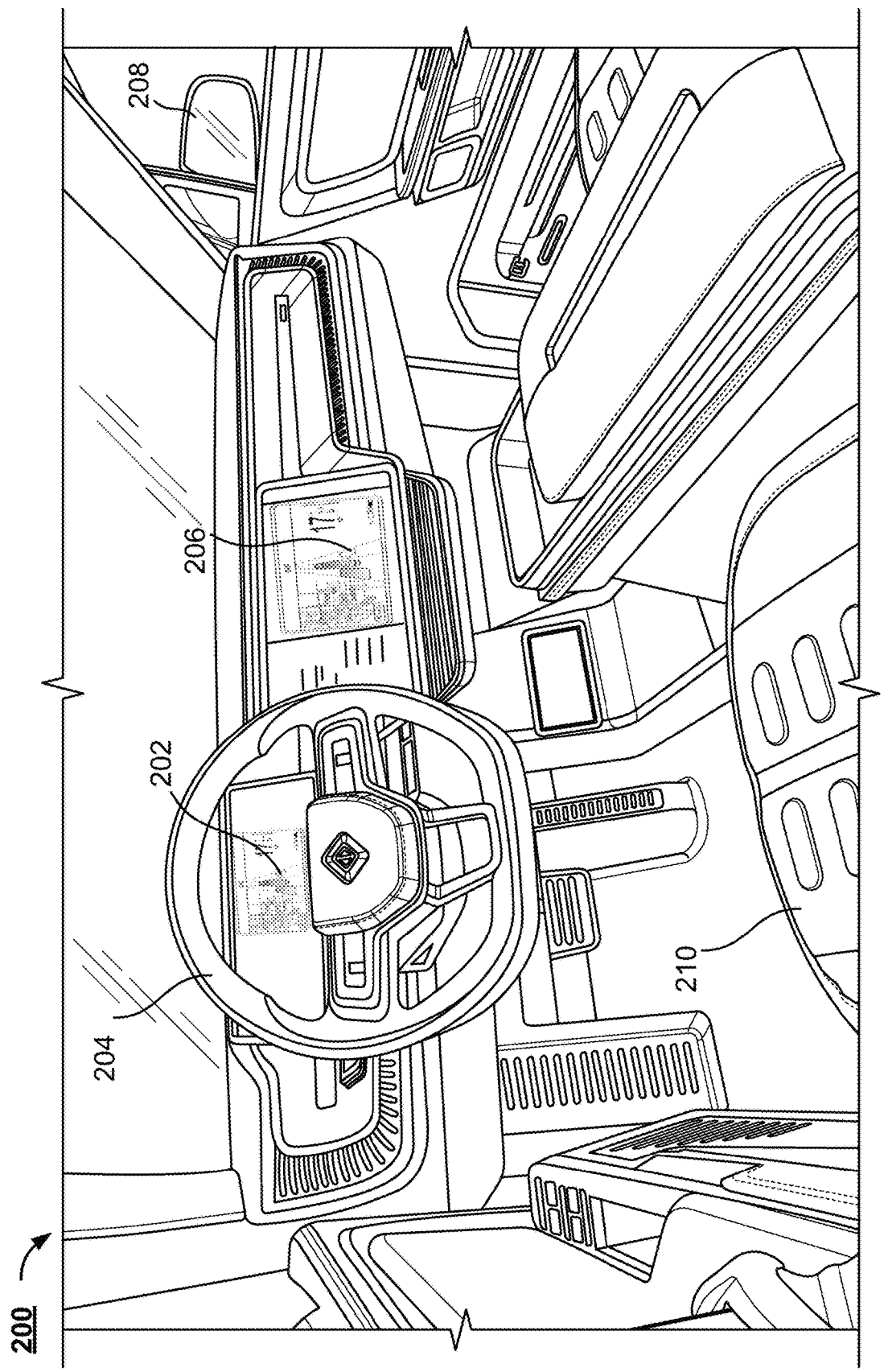
FIG. 2 shows an illustrative depiction of an interior of a vehicle, which includes a user interface, in accordance with some embodiments of the present disclosure.

FIG. 2 shows an illustrative depiction of an interior of a vehicle, which includes user interface 110, in accordance with some embodiments of the present disclosure. A vehicle interior or vehicle cabin 200 may comprise steering wheel 204, one or more displays 202 and/or 206 as part of user interface 110, and driver seat 210. In some embodiments, the interior 200 of a vehicle may be the interior of vehicle 101 in FIG. 1. In some embodiments, the one or more displays 202 and/or 206 may be used as a user interface via touch screen, knobs, buttons, a microphone, or other audio capture devices. Processing circuitry 102 may be configured to receive user input by way of the steering wheel 204 or one or more of the displays 202 and/or 206, in order to make selections and input information. In some embodiments, processing circuitry 102 may generate for display a local navigational view of the vehicle 101 and an interface that displays the lane the vehicle is traveling within and upcoming lane curvature and elevation changes on one or more of the driver display 202 and/or the center display 206 of vehicle 101.

Additionally or alternatively, processing circuitry 102 may be configured to generate for output audio indicators or alerts (e.g., to audibly draw the user's attention to a notification) and/or other visual cues (e.g., conspicuous lighting patterns, such as flashing lights, in an effort to gain the user's attention, such as at light sources located at one or more of steering wheel 204, driver display 202, center display 206, a left side-view mirror, right side-view mirror 208, the rear-view mirror, cabin light, door light, etc.). The audio alerts may be in the form of speech-based instructions and/or an alarm-type indicator transmitted from speakers (e.g., repetitive, high-pitched chimes intended to urgently capture the user's attention). In some embodiments, processing circuitry 102 may generate for output tactile or haptic indicators (e.g., to provide tactile or haptic feedback to a driver, e.g., on driver's seat 210 or a passenger seat).

Figure 3:
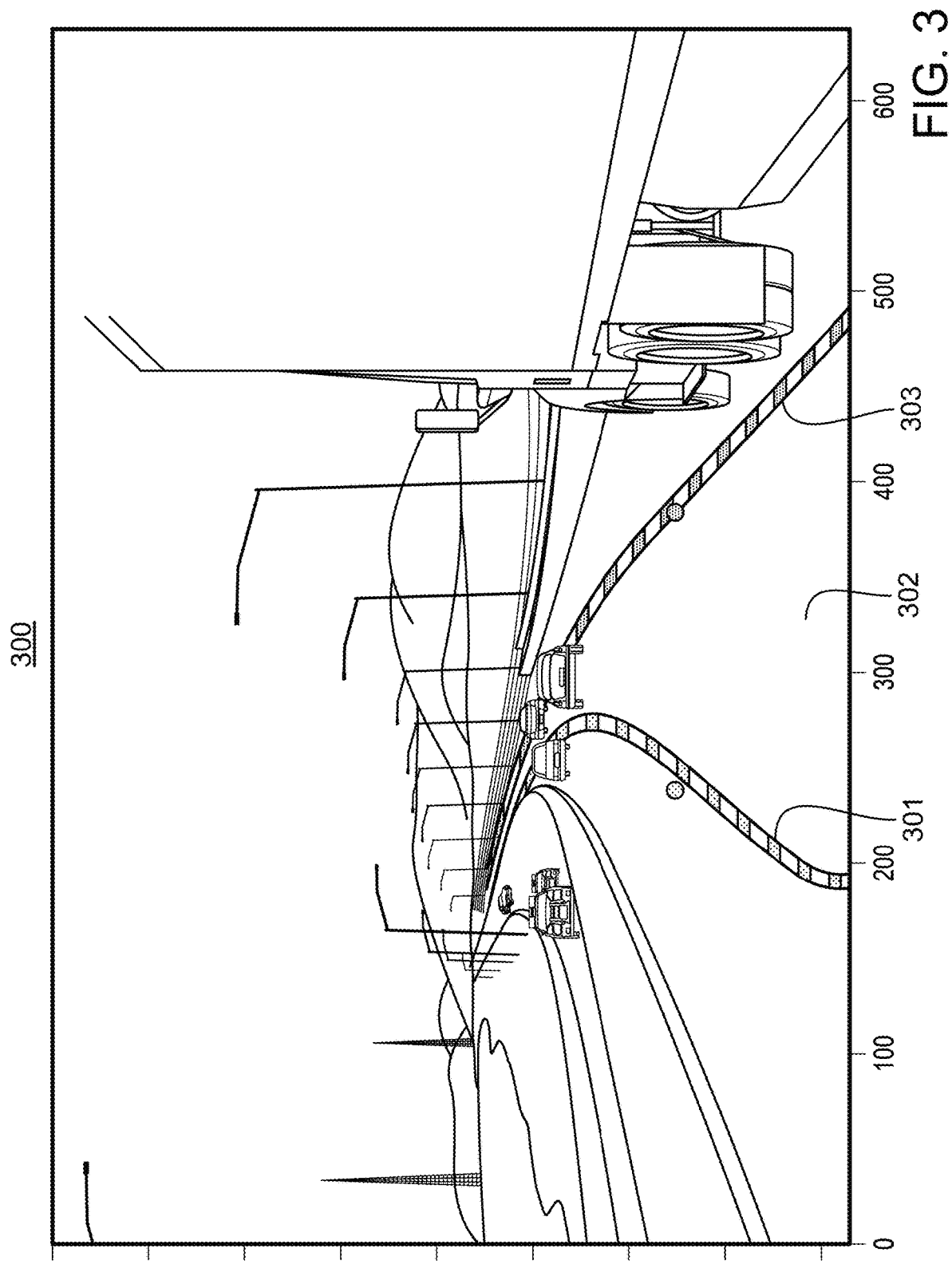
FIG. 3 shows a 2D image captured by the camera of the vehicle and the detection of path indicator instances, in accordance with some embodiments of the present disclosure.

FIG. 3 shows a 2D image 300 captured by the camera of the vehicle and the detection of line instances, in accordance with some embodiments of the present disclosure. Image 300 may be captured by a camera such as camera 122 located on the vehicle. In some embodiments, image 300 may be captured by a camera installed on the vehicle via modification to a production assembly.

The camera 122 may capture a 2D image of the path ahead of the vehicle, depicting different vehicles or obstructions, as well as the lanes in front of the vehicle. In some embodiments, the captured 2D image may include multiple lanes with numerous path indicators on the road ahead of the vehicle. In some embodiments, the road where the vehicle is travelling may be a two-way street without a barrier separating the oncoming traffic, thereby incorporating multiple path indicators on the road and vehicles travelling in opposite directions.

The processing circuitry 102 may process 2D image 300 to determine the instances of the path indicators detected in 2D image 300. In some embodiments, the instances of the path indicators may be determined based on deep learning instance segmentation. For example, the processing circuitry 102 may further process the detected instances (e.g., based on detected instances of the path indicators) to determine one or both of the boundaries of ego lane 302 in which the vehicle 101 is travelling. Segmentation of an image involves segregating objects in a complex visual environment (e.g., separating objects in a lane from an environment surrounding the lane as defined by lines of the lane). Instance segmentation is a computer vision task for detecting and localizing an object in an image. In some embodiments, instance segmentation may be considered a natural sequence of semantic segmentation. Semantic segmentation takes a provided image and marks every pixel in the image based on a category or class. As a result, each pixel of the same category receives a same label. An object detection system may coarsely local multiple objects with boxes (e.g., bounding boxes) which may interface with a semantic segmentation framework to yield to above referenced pixel-level labelling. Where instance segmentation is involved, a segment map of each label of pixels is produced as well as data indicating each instance of a particular class of pixel categories or labels. This provides a detailed and context laden data map of objects that should be identified in the image (e.g., enabling differentiation between objects within a driving lane and objects that do not enter a driving lane). Unlike more limited approaches enabled by semantic segmentation, instance segmentation provides processing circuitry with the ability to recognize multiples of a same object in one image as different objects spatially that are categorized as a same time (e.g., useful for identifying and tracking multiple vehicles in traffic across multiple images such as in a live video feed). In some embodiments, a Kalman filter (e.g., a linear quadratic estimation) may be used with the instance segmentation to reduce the effect of variations between images that capture the same object in different views (e.g., when passing or approaching an object which may result in different viewing angles as captured by a vehicle imaging system).

The determination of ego lane boundaries may be achieved by measuring a distance in the image from the center of the image to the centroids of the detected two-dimensional lines or path indicators. The processing circuitry 102 may first retrieve or determine the coordinates of the center of the image and the coordinates of the centroids of the detected two-dimensional path indicator instances. The processing circuitry 102 may then calculate distances between the coordinates of the center of the image and the coordinates of the centroids. Based on the measurements, the closest line to the left of the center of the image (i.e., line instance 301) may be classified as the left ego line by the processing circuitry 102 and the closest line instance to the right of the center of the image (i.e., line instance 303) may be classified as the right ego line by the processing circuitry 102. In the embodiment depicted in FIG. 3, the processing circuitry 102 may determine that the left ego line 301 and the right ego line 303 collectively form the boundaries of the ego lane 302. In some embodiments, the processing circuitry 102 may only detect one instance of a path indicator in the 2D image and may determine only a single ego path indicator forming the left or right boundary of the ego lane 302 in which the vehicle 101 is travelling. In some embodiments, the processing circuitry 102 may detect more than two instances of path indicators in the 2D image signaling the presence of additional traveling lanes.

Following the determination of the left ego line 301 and right ego line 303 collectively forming the boundaries of the ego lane 302, the processing circuitry 102 may further process the 2D image from the camera 122 to determine curve fits for the ego lane boundaries. In some embodiments, the processing circuitry 102 may fit a third order polynomial to the instance of the boundaries of the ego lane in order to obtain curve fits for the left ego line 301 and the right ego line 303. In some embodiments, a Bezier curve or any other suitable curve fit may be used to obtain the curve fits for the left ego line 301 and the right ego line 303. The processing circuitry 102 may then process the determined curve fits to calculate the sinuosity of the ego lane. The sinuosity may be determined by dividing a length of the curve fit by a distance of a shortest path between a starting point and an ending point of the curve fit. The processing circuitry 102 may measure the shortest path between the starting point and the end point in the 2D image by measuring a straight line between the two points. When left and right ego lane boundaries are identified, two sinuosities are determined, a first for the left ego lane boundary and a second for the right ego lane boundary. The sinuosity of the ego lane may be determined, for example, by selecting the larger or the smaller of the two determined sinuosities or by averaging the two sinuosities. A determination of the curvature in the lane may then be made based on the sinuosity of the ego lane, as calculated by the processing circuitry 102 of the vehicle 101. Elevation changes can be determined by comparing the sinuosities of the left and right ego lane boundaries.

Figure 4:
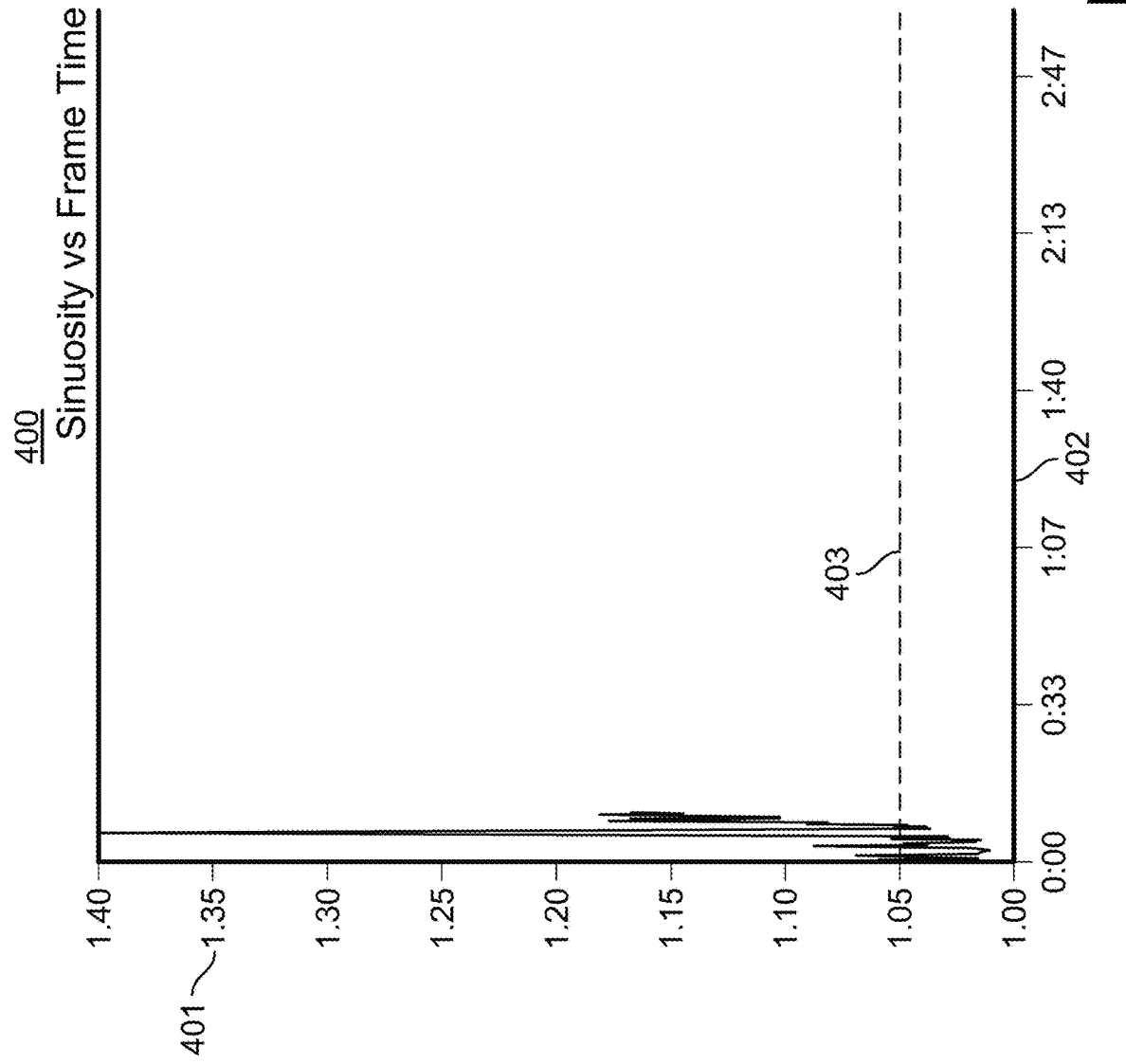
FIG. 4 shows a graph depicting the relationship between sinuosity and frame time of the camera of the vehicle, in accordance with some embodiments of the present disclosure.

FIG. 4 shows a graph 400 depicting the relationship between sinuosity and frame time of the camera of the vehicle, in accordance with some embodiments of the present disclosure. Graph 400 provides a visual characterization of how a larger sinuosity value, yields a greater curve as characterized by processing of the image captured. Graph 400 may be used (or processing configured to generate Graph 400) to create the map of the ego lines for defining the lane in the user interface.

For each 2D image taken by the camera 122, the processing circuitry 102 may calculate the sinuosity of the ego lane based on the detected path indicator instances and the curve fits of the ego lane boundaries, as described above with reference to FIG. 3. If the length of the curve fit, as calculated on the ego lane boundary, is determined to be longer than the distance of the shortest path between the starting point and the end point, then the sinuosity value for that frame of the 2D image is determined to be greater than 1. Graph 400 depicts the sinuosity for each frame 401 on the Y-axis, as calculated by the processing circuitry 102 of the vehicle 101. The X-axis depicts the frame time 402 at which the 2D images are being taken by the camera 122 of the vehicle 101. As the vehicle continues to drive, at every frame time, the camera 122 of the vehicle 101 may continue to take 2D images. For each image, the processing circuitry 102 of the vehicle 101 processes the images and calculates the sinuosity of the ego boundary lines (e.g., boundary path indicators) of the ego lane in which the vehicle 101 is travelling. The calculated sinuosity value is mapped on the graph, in correlation to the frame time, as shown in FIG. 4. The processing circuitry may use a sinuosity threshold, beyond which a determination of the presence of curvature in the ego lane may be made. Graph 400 shows a threshold line 403 depicting a sinuosity threshold of 1.05. Anytime the sinuosity value goes above 1.05 for any given frame time, the processing circuitry makes a determination that the ego lane has oncoming curvature. It will be understood that the sinuosity threshold of 1.05 is merely illustrative and that other threshold values may be used as appropriate. In some embodiments, the threshold value may be adjusted based on properties of the camera being used (e.g., based on the field of view and lens distortion).

Figure 5:
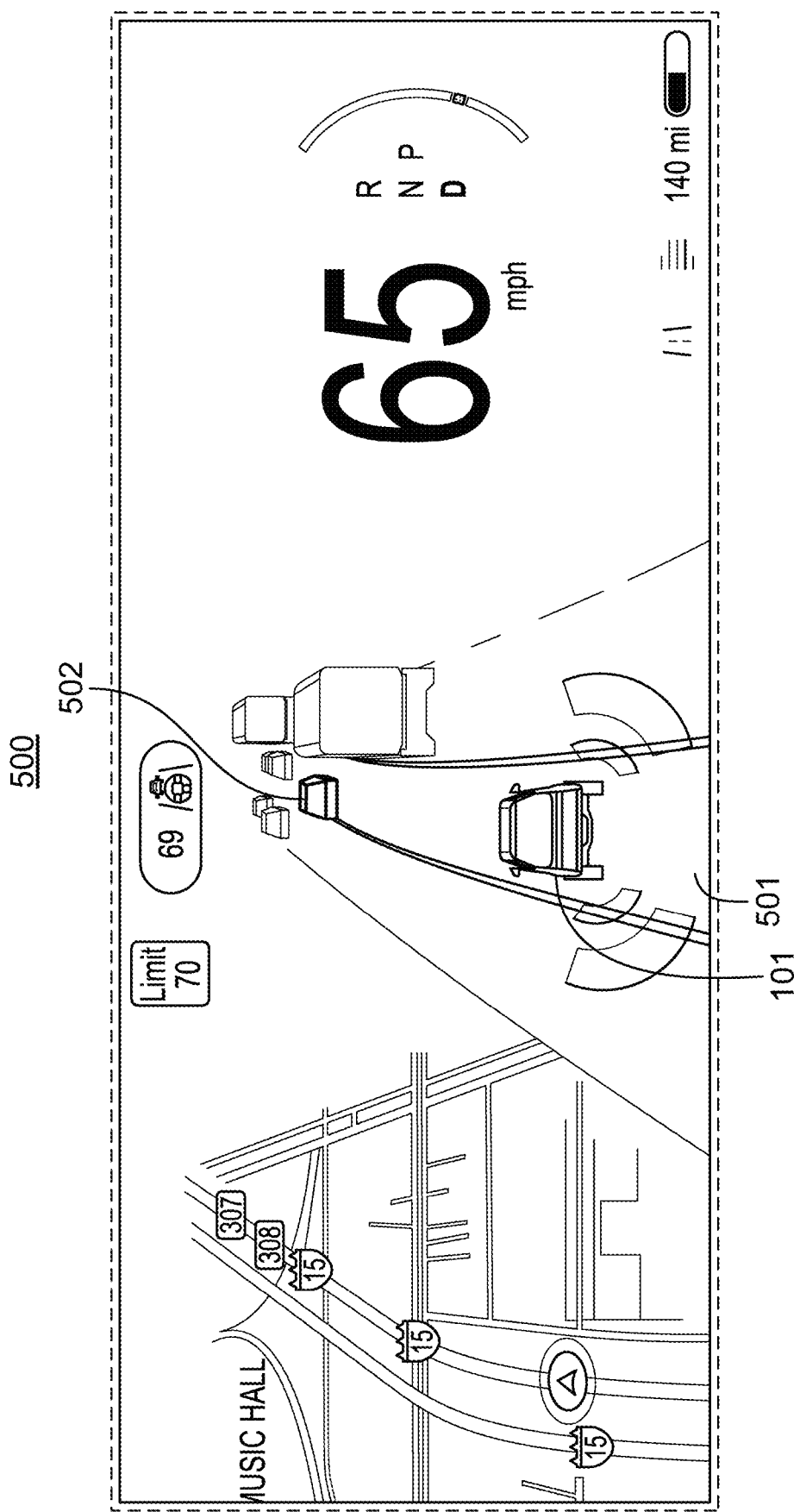
FIG. 5 shows a user interface display depicting an ego lane, in accordance with some embodiments of the present disclosure.

FIG. 5 shows a user interface display 500 depicting an ego lane 501, in accordance with some embodiments of the present disclosure. In some embodiments, user interface display 500 may correspond to display 202 or 206 of vehicle 101. In some embodiments, when vehicle 101, using its processing circuitry 102, determines that the ego lane in which the vehicle is travelling has oncoming curvature or elevation changes, the processing circuitry 102 may use this information and further process the 2D image to detect other objects in the path of travel of the vehicle 101.

In some embodiments, the processing circuitry 102 may make the determination of whether other vehicles or objects are in the path of travel of the vehicle 101 by calculating the coordinates of the detected objects or other vehicles in front of the vehicle 101 in the 2D image and determining if those coordinates fall in the ego lane based on the curvature or elevation changes of the ego lane. If it is determined by the processing circuitry 102 that the object or the other vehicles are in the path of travel of the vehicle 101, the processing circuitry may use the user interface display 500 within the vehicle to notify the user of an object in the path of travel. The user interface display 500 may depict a visual representation 501 of the ego lane and surrounding vehicles and lanes based on the determined curvature and/or elevation changes of the ego lane in which the vehicle 101 is travelling. The processing circuitry 102 may map the curvature of the ego lane, as determined based on the curve fit and sinuosity, and may convert it into a visual representation 501 to be presented on user interface display 500.

In some embodiments, the visual representation of ego lane 501 may further include the position of the vehicle 101 on the ego lane. In some embodiments, the user interface display 500 may further include other vehicles driving on the road alongside the vehicle 101. The processing circuitry 102 may calculate the coordinates of each of the other vehicles driving on the road based on the 2D image from the camera 122 (and possibly using other vehicles sensors and cameras) and position them at appropriate locations on the user interface display 500. Based on the positioning of the other vehicles or obstructions relative to vehicle 101 and ego lane 501, the user is presented with a clear depiction of which vehicles or obstructions are in its path of travel. Additionally, other notifications may be presented on user interface display 500 if vehicle 101 is approaching a stopped or slower vehicle or obstruction.

The notifications to the user, although shown in the form of a visual representation on user interface display 500 in the embodiment of FIG. 5, may also be made using voice notification, vibration to the steering wheel and the like.

Figure 6:
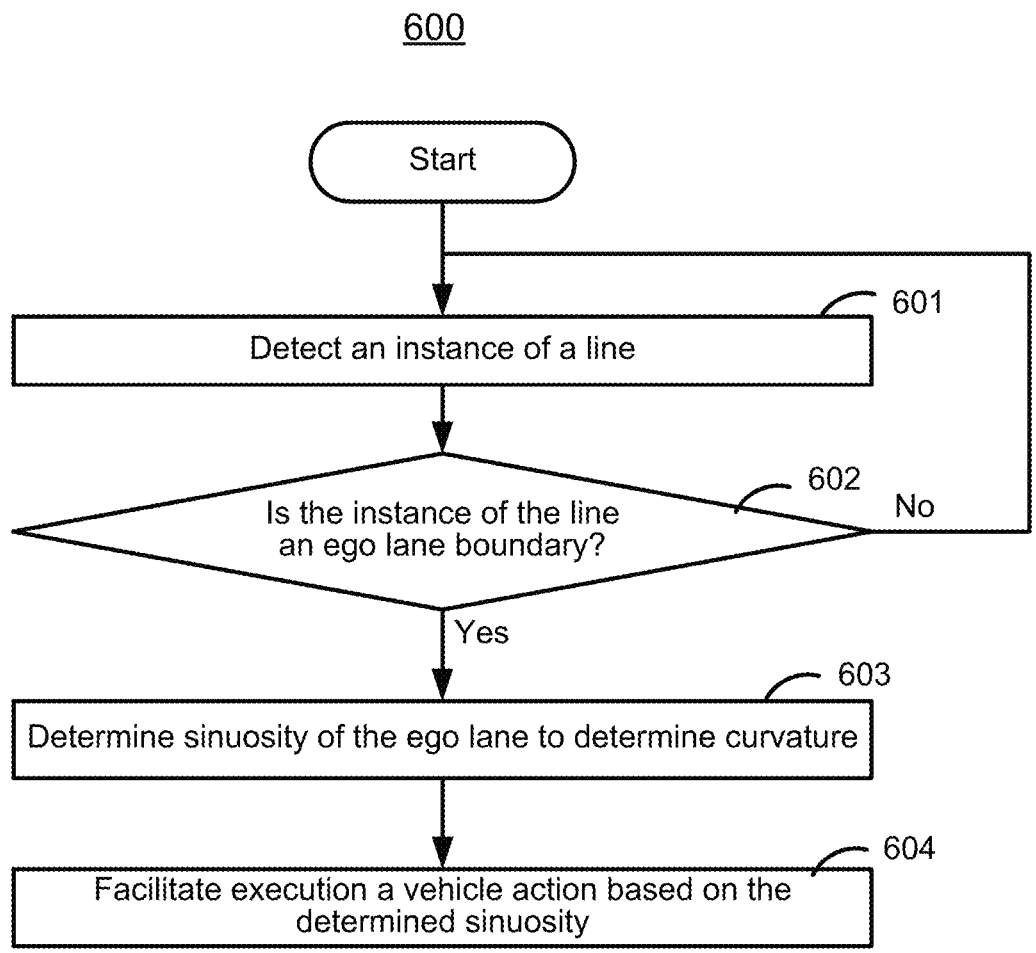
FIG. 6 is a flowchart of an illustrative process for detecting curvature in the lane of travel of the vehicle, in accordance with some embodiments of the present disclosure.

FIG. 6 is a flowchart of an illustrative process 600 for detecting curvature in the lane of travel of the vehicle, in accordance with some embodiments of the present disclosure. Process 600 may be executed by processing circuitry 102 of vehicle 101.

At 601, the processing circuitry 102 processes a 2D image to detect instances of lines in the 2D image. For example, processing circuitry 102 may process 2D image 300 and detect line instance 301 or line instance 303. In some embodiments, the instances of lines, or path indicators, may be detected based on deep learning instance segmentation. The processing circuitry 102 may detect numerous lines on the 2D image where, for example, the vehicle 101 is travelling on a highway with multiple lanes. In some embodiments, the processing circuitry 102 may detect only one or two path indicators where the vehicle 101 is travelling on a rural road or a road where the upkeep of the road conditions have been poor.

At 602, the processing circuitry 102 processes the data extracted from the 2D images to determine whether the line (or path indicator) instance is a boundary of the ego lane, which is the lane in which the vehicle 101 is travelling. In some embodiments, this determination is achieved by measuring a distance in the image from a center of the image to the centroid of the detected two-dimensional line. The processing circuitry 102 may retrieve the coordinates of the center of the image and calculate the coordinates of the centroid of the detected two-dimensional line. The processing circuitry 102 may then calculate the distance between the coordinates of the center of the image and the coordinates of the centroid of the detected two-dimensional line. Based on the measurement, a line closest to the left of the center of the image may be classified as the left ego line boundary by the processing circuitry 102 and a line closest to the right of the center of the image may be classified as the right ego line boundary by the processing circuitry 102. If it is determined that the distance from the center is too large or too small, the processing circuitry 102 may make a determination that the line instance is not a boundary of the ego lane.

If it is determined that the line instance is not an ego lane boundary, the process 600 stops and returns to the beginning to begin processing the next 2D image. If, however, it is determined that the line instance is an ego lane boundary, at 603, the processing circuitry 102 calculates the sinuosity of the ego lane boundary. In some embodiments, the processing circuitry 102 further processes the instance of the line and determines a curve fit for the ego lane boundary. The processing circuitry 102 may, for example, fit a third order polynomial to the instance of the line in order to obtain the curve fit. The processing circuitry 102 then processes the determined curve fit to determine the sinuosity of the ego lane.

In some embodiments, the sinuosity is determined by dividing a length of the curve fit by a distance of a shortest path between a starting point and an ending point of the curve fit. The processing circuitry 102 may measure the shortest path between the starting point and the end point by measuring a straight line between the two points. The sinuosity of the ego lane may be used by the processing circuitry 102 to determine whether the ego lane has curvature or elevation changes. If the length of the curve fit is determined to be longer than the distance of the shortest path between the starting point and the end point, then the sinuosity value for the curve fit will be greater than 1. The processing circuitry 102 may use a threshold value (e.g., 1.05) to make a determination of whether curvature is present in the ego lane in which the vehicle 101 is travelling.

At 604, one or more components or elements of vehicle 101 facilitates execution of a vehicle action based on the determined sinuosity. For example, one or more vehicle modules or processing circuitries associated with different vehicle modules may be activated based on the determined sinuosity. As a result, one or more processing circuitries may perform one or more of generation or transmission of instructions for execution of a module action resulting in a vehicle action (e.g., an actuator causes changes in vehicle feedback to the user or vehicle responsiveness to user inputs). In some embodiments, the vehicle action may be to apply the brake upon detecting an obstruction in the path of travel of the vehicle 101 based on the sinuosity. In some embodiments, the vehicle action may be to display sinuosity or curvature information to the user of vehicle 101. In some embodiments, the actions performed by the vehicle 101 may be in the form of providing an alert to the user via the user interface 110. In some embodiments the vehicle 101 may alert the user using other means of notifications such as sound or vibration of the steering wheel.

Figure 7:
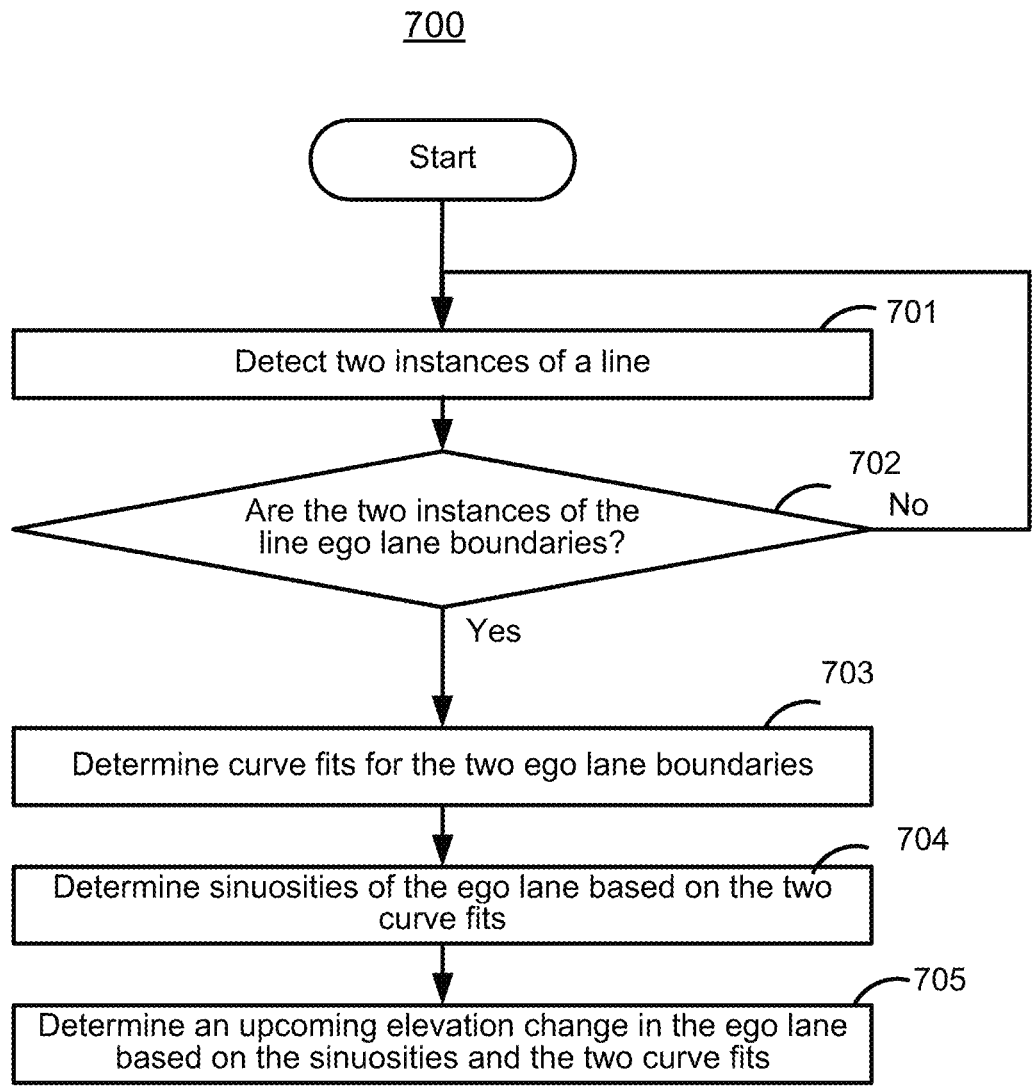
FIG. 7 is a flowchart of an illustrative process for detecting elevation changes in the lane of travel of the vehicle, in accordance with some embodiments of the present disclosure.

FIG. 7 is a flowchart of an illustrative process 700 for detecting elevation changes in the lane of travel of the vehicle, in accordance with some embodiments of the present disclosure. Process 700 may be executed by processing circuitry 102 of vehicle 101.

At 701, the processing circuitry 102 processes a 2D image to detect two instances of lines (or path indicators) in the 2D image. In some embodiments, the instances of lines may be detected based on deep learning instance segmentation. The processing circuitry 102 may detect numerous lines on the 2D image where, for example, the vehicle 101 is travelling on a highway with multiple lanes. In some embodiments, the processing circuitry 102 may detect only one or two lines where the vehicle 101 is travelling on a rural road or a road where the upkeep of the road conditions have been poor. To make a determination of the elevation, processing circuitry 102 uses the left boundary line and the right boundary line of the ego lane in which the vehicle 101 is travelling.

At 702, the processing circuitry 102 processes the data extracted from the 2D images to determine whether two line instances have been detected and if they are the boundaries of the ego lane. In some embodiments, this determination is achieved by measuring distances in the image from a center of the image to the centroid of the two-dimensional lines as described above with reference to FIG. 6.

If it is determined that a line instance is not an ego lane boundary, the process 700 stops and returns to the beginning to begin processing the next 2D image. If, however, it is determined that the line instances are ego lane boundaries (i.e., both the left ego boundary and the right ego boundary has been detected), at 703, the processing circuitry 102 calculates curve fits of the two ego lane boundaries. The processing circuitry 102 may fit a third order polynomial to the instances of the boundaries of the ego lane in order to obtain curve fits for both the left ego lane boundary and the right ego lane boundary. At 704, the processing circuitry 102 then processes the determined two curve fits of the left ego boundary line and the right ego boundary line to calculate a sinuosity of the ego lane.

The sinuosity may be determined by dividing a length of the curve fit by a distance of a shortest path between a starting point and an ending point of the curve fit. The processing circuitry 102 may measure the shortest path between the starting point and the end point in the 2D image by measuring a straight line between the two points.

At 705, a determination of an upcoming elevation change in the ego lane may then be made based on the sinuosities of the left ego boundary line and the right ego boundary line and the curve fits. For example, when vehicle 101 is driving on a straight lane that is on a flat surface, the left and right ego boundary lines are generally straight. However, if the surface curves upward (i.e., there is an increase in elevation), then the left ego boundary line is expected to curve to the left and the right ego boundary line is expected to curve to the right. In addition, if the surface curves downward (i.e., there is a decrease in elevation), then the left ego boundary line is expected to curve to the right and the right ego boundary line is expected to curve to the left. Accordingly, if the processing circuitry 102 determines that the sinuosities of both the left ego lane boundary and the right ego lane boundary are greater than a threshold (e.g., 1.02) and the curve fits of the left and right ego lane boundaries are curved in the opposite direction, then the processing circuitry 102 will determine the presence of an oncoming elevation change in the path of travel of the vehicle 101 (e.g., an increase in elevation or a decrease in elevation).

Figure 8:
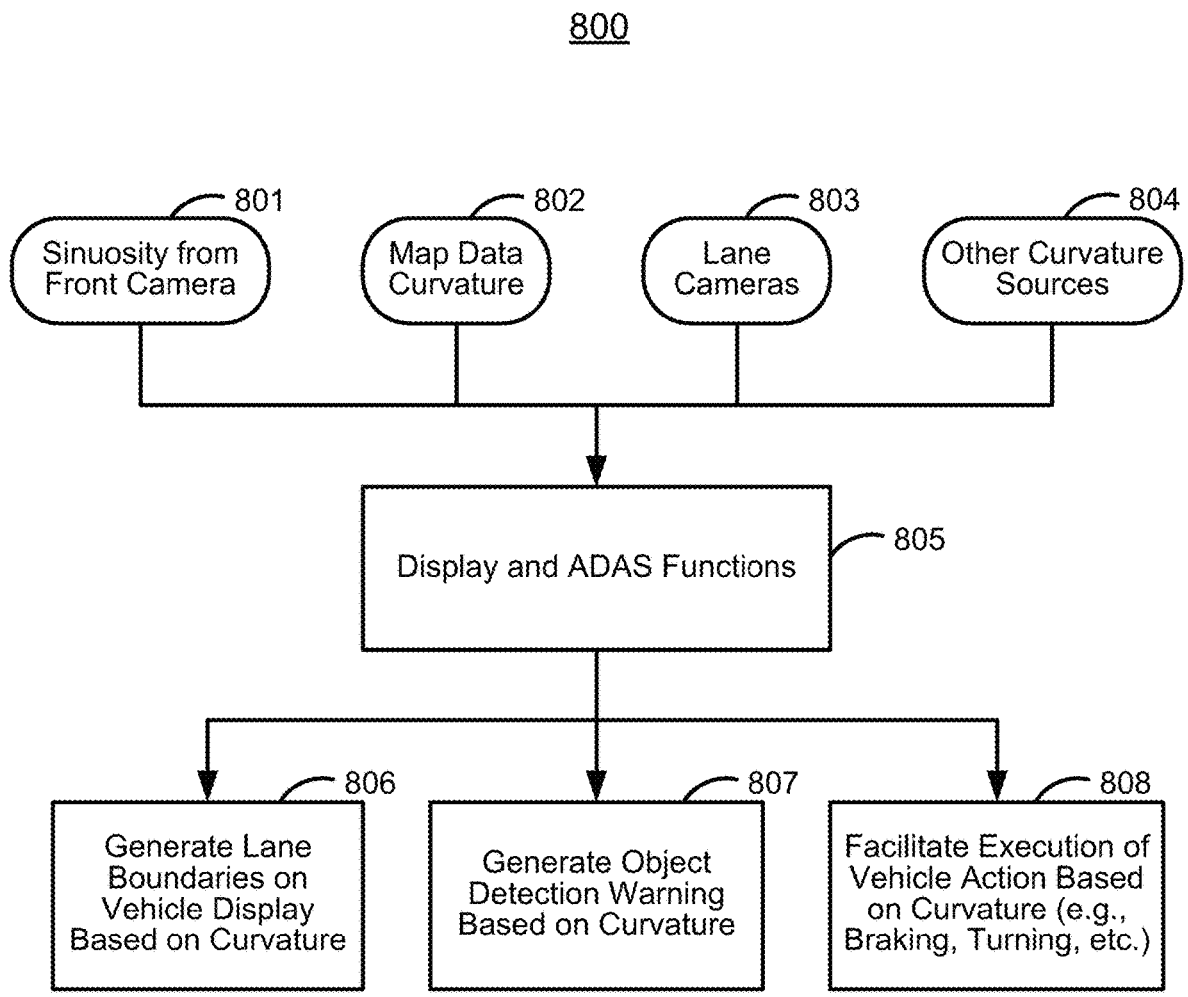
FIG. 8 is a flowchart of an illustrative process for processing lane curvature data from numerous sources to generate user notifications and performing vehicle actions, in accordance with some embodiments of the present disclosure.

FIG. 8 is a flowchart of an illustrative process 800 for processing lane curvature data from numerous sources to generate user notifications and performing vehicle actions, in accordance with some embodiments of the present disclosure. Process 800 may be executed by processing circuitry 102 of vehicle 101. In process 800, display and ADAS functions use curvature data inputs from numerous sources to perform one or more vehicle actions.

At 801, the sinuosity for one or more ego lane boundaries calculated by the processing circuitry 102 based on a 2D image from camera 122 of the vehicle 101 is sent to display and ADAS functions. The sinuosity for the ego lane boundaries may be calculated as described above with reference to FIGS. 6 and 7.

At 802, map data curvature is provided as an input to the display and ADAS functions. The map data (e.g., data provided by the vehicle manufacturer or third party vendors) may include curvature information. In some embodiments, the processing circuitry determines the vehicle's location (e.g., using GPS system 135) and uses the vehicle's location to extract curvature from the map data. In some embodiments, the map data is stored in database 140 and the vehicle location is transmitted to server 138 using cloud network 134 and server 138, in response to the vehicle location, transmits the map data curvature to vehicle 101.

At 803, lane curvature information from lane cameras is sent to the display and ADAS functions. In some embodiments, the lane cameras are two of the cameras 122 positioned to show the left and right lane markings of the ego lane. For example, the lane cameras may be located in the side-view mirrors facing forward and downward. The processing circuitry 102 may receive image data from the lane cameras and use them to separately detect lane curvature. In some embodiments, the curvature is detected by determining the sinuosity of the left and right lane markings, as described above with reference to FIGS. 6 and 7.

At 804, other curvature sources may further be used to extract the lane curvature data and transmit it to the display and ADAS functions. These other curvature sources may be third party vendor cameras installed on the vehicle 101 or other sensors. In some embodiments, the other curvature sources may be cameras located on other nearby vehicles driving alongside vehicle 101.

At 805, the display and ADAS functions receive and process the curvature information received from all the sources. By using curvature from multiple sources, a more robust or accurate determination may be made as to whether the path of travel of the vehicle has curvature or upcoming elevation changes as described above with reference to FIGS. 6 and 7. In some embodiments, an average curvature is determined by averaging the curvature from the multiple sources. In some embodiments, a median curvature is determined from the multiple sources. In some embodiments, the curvature from the multiple sources can be consolidated using any suitable technique to make a final determination of the ego lane curvature and/or elevation change to perform one or more vehicle actions as shown at 806, 807, and 808.

At 806, based on the lane curvature information received and calculated by the display and ADAS functions, the processing circuitry 102 generates lane boundaries to be displayed on the user interface 110 located inside the vehicle 101. In some embodiments, the lane boundaries may be depicted as shown in user interface display 500 of FIG. 5. The display and ADAS functions may further determine the positioning of other vehicles driving around the vehicle 101 and, based on their positions, determine which of the vehicles are in the path of travel of the vehicle 101. The processing circuitry 102 may further display the positions of these other vehicles on the user interface 110. In some embodiments, the position of these vehicles may be depicted on the user interface display 500 as shown in FIG. 5.

At 807, the display and ADAS functions generate an object detection warning based on if a vehicle or other obstruction is in the path of travel of the vehicle 101. The warning may be provided to the user via the user interface 110 located inside the vehicle 101. In some embodiments, the warning may be provided to the user via an audio notification. In some embodiments, the warning may be in the form of vibration to the steering wheel.

At 808, the processing circuitry 102 of the vehicle 101 facilitates execution of a vehicle action based on the curvature of the ego lane and object detection in the path of travel, performs a vehicle action. Additionally, or alternatively, one or more processing circuitries within the vehicle may be activated or utilized for this facilitation (e.g., as described in reference to block 604 of FIG. 6). In some embodiments, the vehicle action may be to apply the brake. In some embodiments, the vehicle action may be to turn the steering wheel to change the lane or to avoid an obstruction in the path of travel. In some embodiments, the vehicle action may be to slow the speed of the vehicle. While a few examples of vehicle actions have been provided herein, the actions are not limited thereto, and other vehicle actions may be performed based on the calculated curvature and/or elevation changes of the ego lane and the detection of obstructions in the path of travel of the vehicle 101.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
    detecting, using processing circuitry, an instance of a line in a two-dimensional image captured by a vehicle;
    determining, using the processing circuitry, that the instance of the line is a lane boundary for a lane associated with the vehicle;
    determining, using the processing circuitry, a curve fit for the lane boundary based on the instance of the line;
    determining, using the processing circuitry, a sinuosity of the lane based on the curve fit by dividing a length of the curve fit by a distance of shortest path between a starting point and an ending point of the curve fit; and
    facilitating, using the processing circuitry, execution of a vehicle action based on the determined sinuosity.

2. The method of claim 1, further comprising using a camera on the vehicle to capture the two-dimensional image.

3. The method of claim 2, wherein determining that the instance of the line is the lane boundary comprises determining a distance between a center of the two-dimensional image and a centroid of the instance of the line.

4. The method of claim 1, wherein determining the curve fit for the lane boundary comprises fitting a third order polynomial to the instance of the line.

5. The method of claim 1, further comprising:
    determining that the lane comprises curvature based on a comparison of the sinuosity to a threshold.

6. The method of claim 1, wherein:
    the instance of the line comprises a first instance of a line;
    the lane boundary comprises a left line boundary; and
    the curve fit comprises a first curve fit, the method further comprising:
        detecting a second instance of a line in the two-dimensional image;
        determining that the second instance of the line is a right lane boundary for the lane; and
        determining a second curve fit for the right lane boundary based on the second instance of the line, wherein:
            determining the sinuosity of the lane boundary is based on the first curve fit and the second curve fit.

7. The method of claim 6, further comprising:
    determining an upcoming elevation change in the lane based on the first curve fit and the second curve fit.

8. The method of claim 6, further comprising:
    determining an upcoming increase in elevation based on the first curve fit having curvature to the left and the second curve fit having curvature to the right.

9. The method of claim 1, wherein performing the vehicle action comprises:
    displaying the lane on a display of the vehicle based on the sinuosity; or
    performing an advanced driver assistance system (ADAS) action based on the sinuosity.

10. A system comprising:
    a camera of a vehicle configured to capture a two-dimensional image; and
    processing circuitry configured to:
        detect an instance of a line in the two-dimensional image captured by the vehicle;
        determine that the instance of the line is a lane boundary for a lane associated with the vehicle;
        determine a curve fit for the lane boundary based on the instance of the line;
        determine a sinuosity of the lane based on the curve fit by dividing a length of curve fit by a distance of a shortest path between a starting point and an ending point of the curve fit; and
        facilitate execution of a vehicle action based on the determined sinuosity.

11. The system of claim 10, wherein the processing circuitry is further configured to capture an image using the camera on the vehicle.

12. The system of claim 11, wherein the processing circuitry is further configured to determine a distance between a center of the two-dimensional image and a centroid of the instance of the line.

13. The system of claim 10, wherein the processing circuitry is further configured to fit a third order polynomial to the instance of the line.

14. The system of claim 10, wherein the processing circuitry is further configured to determining that the lane comprises curvature based on a comparison of the sinuosity to a threshold.

15. The system of claim 10, wherein:
    the instance of the line comprises a first instance of a line;
    the lane boundary comprises a left line boundary; and
    the curve fit comprises a first curve fit, and wherein the processing circuitry is further configured to:
        detect a second instance of a line in the two-dimensional image;
        determine that the second instance of the line is a right lane boundary for the lane;
        determine a second curve fit for the right lane boundary based on the second instance of the line; and
        determine the sinuosity of the lane boundary based on the first curve fit and the second curve fit.

16. The system of claim 15, wherein the processing circuitry is further configured to determine an upcoming elevation change in the lane based on the first curve fit and the second curve fit.

17. The system of claim 15, wherein the processing circuitry is further configured to determine an upcoming increase in elevation based on the first curve fit having curvature to the left and the second curve fit having curvature to the right.

18. A non-transitory computer-readable medium having non-transitory computer-readable instructions encoded thereon that, when executed by a processor, causes the processor to:
    detect, using processing circuitry, an instance of a line in a two-dimensional image captured by a vehicle;

determine, using the processing circuitry, that the instance of the line is a lane boundary for a lane associated with the vehicle;

determine, using the processing circuitry, a curve fit for the lane boundary based on the instance of the line;

determine, using the processing circuitry, a sinuosity of the lane based on the curve fit by dividing a length of curve fit by a distance of a shortest path between a starting point and an ending point of the curve fit; and facilitate, using the processing circuitry, execution of a vehicle action based on the determined sinuosity.

* * * * *